United States Patent [19]

Hart et al.

[11] Patent Number: 4,826,613

[45] Date of Patent: May 2, 1989

[54] LUBRICATING OIL CONTAINING DISPERSANT VISCOSITY INDEX IMPROVER

[75] Inventors: William P. Hart, Freehold, N.J.; Christopher S. Liu, Poughkeepsie, N.Y.

[73] Assignee: Texaco Inc., White Plains, N.Y.

[21] Appl. No.: 910,042

[22] Filed: Sep. 22, 1986

[51] Int. Cl.$^4$ ................ C10M 107/02; C08F 210/00
[52] U.S. Cl. ................................ 252/52 R; 252/48.6; 525/331.8; 525/359 A
[58] Field of Search ............................ 252/48.2, 52 R; 525/331.7, 332.1, 359.4, 379, 308, 309, 48.6

[56] References Cited

U.S. PATENT DOCUMENTS

| | | | |
|---|---|---|---|
| 2,660,563 | 11/1953 | Banes et al. | 252/48.2 |
| 3,761,458 | 9/1973 | Holler et al. | 252/48.2 |
| 3,793,203 | 2/1974 | Driscoll et al. | 252/48.2 |
| 3,842,010 | 10/1974 | Pappas et al. | 252/48.2 |
| 3,972,243 | 8/1976 | Driscoll et al. | 252/48.2 |
| 3,997,704 | 12/1976 | Aurichio | 525/309 |
| 4,067,841 | 1/1978 | Aurichio | 525/308 |
| 4,147,643 | 4/1979 | Dindar et al. | 252/48.2 |

*Primary Examiner*—William R. Dixon, Jr.
*Assistant Examiner*—James M. Hunter, Jr.
*Attorney, Agent, or Firm*—Robert A. Kulason; James J. O'Loughlin; Carl G. Seutter

[57] ABSTRACT

Lubricating oil of improved dispersancy and viscosity index contains ethylene-propylene polymer bearing glycidyl methacrylate graft which as been functionalized with mercaptoacetic acid.

19 Claims, No Drawings

LUBRICATING OIL CONTAINING DISPERSANT VISCOSITY INDEX IMPROVER

FIELD OF THE INVENTION

This invention relates to lubricating oils. More particularly it relates to lubricating compositions characterized by improved dispersancy and viscosity index.

BACKGROUND OF THE INVENTION

As is well known to those skilled in the art, it is possible to improve the properties of a lubricating oil by addition of various components. The viscosity index may be improved; the dispersancy may be improved. Continued efforts are being made to attain improvement in these and other properties, and to attain these improvements at reduced cost. It is an object of this invention to provide an improved lubricating composition. Other objects will be apparent to those skilled in the art.

STATEMENT OF THE INVENTION

In accordance with certain of its aspects, this invention is directed to a polymer comprising (i) a carbon-carbon backbone containing residual unsaturation; and graft polymerized thereon to form graft polymer (ii) a first reactant containing ethylenic unsaturation and an epoxide moiety; said graft polymer being derivatized with (iii) a second reactant containing at least one —SH group and at least one —COOH group.

DESCRIPTION OF THE INVENTION

The Polymer

The polymer, onto which the dispersant monomers of this invention may be grafted, may include an oil-soluble, substantially linear, carbon-carbon backbone polymer. Typical carbon-carbon backbone polymers prepared from monomers bearing an ethylenically unsaturated polymerizable double bond which may be employed include homopolymers or copolymers prepared from monomer typically having the formula C=CA wherein A may typically be: hydrogen; hydrocarbon such as alkyl, cycloalkyl, aralkyl, alkenyl, aryl, etc.; halide, acyloxy, etc.

Illustrative of such monomers may be acrylates, methacrylates, vinyl halides (such as vinyl chloride); styrene, olefins such as propylene, butylene, etc.; vinyl acetate; dienes such as butadiene, isoprene, hexadiene, ethylidene norbornene, etc. Homopolymers of olefins (such as polypropylene, polybutylene, etc.), dienes, (such as hydrogenated polyisoprene;, or copolymers of ethylene with e.g., butylene and higher olefins, styrene with isoprene and/or butadiene may be employed. The preferred carbon-carbon backbone polymers include those selected from the group consisting of ethylene-propylene copolymers (EPM or EPR) and ethylene-propylene-diene terpolymers (EPDM or EPT).

When the charge polymer is an ethylene-propylene copolymer (EPM, also called EPR polymers), it may be formed by copolymerization of ethylene and propylene under known conditions preferably Ziegler-Natta reaction conditions. The preferred EPM copolymers contain units derived from ethylene in amount of 40–70 mole %, preferably 50–60 mole %, say 55 mole %, the remainder being derived from propylene.

The molecular weight $\overline{M}_n$ of the EPM copolymers which may be employed may be 10,000–1,000,000, preferably 20,000–200,000, say 140,000. The molecular weight distribution may be characterized by $\overline{M}_w/\overline{M}_n$ of less than about 15, preferably 1.2–10, say 1.6.

Illustrative EPM copolymers which may be employed in practice of the process of this invention may be those set forth in the following table, the first listed being preferred:

A. The Epsyn brand of EPM marketed by Copolymer Rubber and Chemical Corporation containing 60 mole % of units derived from ethylene and 40 mole % of units derived from propylene, having a molecular weight $\overline{M}_n$ of 140,000 and a poly dispersity index $\overline{M}_w/\overline{M}_n$ of 1.6.

B. The Epcar 505 brand of EPM marketed by B. F. Goodrich Co., containing 50 mole % of units derived from ethylene and 50 mole % of units derived from propylene and having a $\overline{M}_n$ of 25,000 and a polydispersity index of 2.5.

C. The Esprene brand of EPR marketed by Sumitomo Chemical Co., containing 55 mole % of units derived from ethylene and 45 mole % of units derived from propylene and having a $\overline{M}_n$ of 25,000 and polydispersity index of 2.5;

When the charge polymer is a terpolymer of ethylene-propylene-diene (EPT or EPDM), it may be formed by copolymerization of ethylene, propylene and diene third monomer. The third monomer is commonly a non-conjugated diene typified by dicyclopentadiene; 1,4-hexadiene; or ethylidene norbornene. Polymerization is effected under known conditions generally comparable to those employed in preparing the EPM products. The preferred terpolymers contain units derived from ethylene in amount of 40–70 mole %, preferably 50–65 mole %, say 60 mole % and units derived from the propylene in amount of 20–60 mole %, preferably 30–50 mole %, say 38 mole % and units derived from third diene monomer in amount of 0.5–15 mole %, preferably 1–10 mole %, say 2 mole %. The molecular weight $\overline{M}_n$ of the terpolymers may typically be 10,000–1,000,000, preferably 20,000–200,000, say 120,000. Molecular weight distribution of the useful polymers is preferably narrow viz a $\overline{M}_w/\overline{M}_n$ of typically less than 15, preferably 1.5–10, say 2.2.

Illustrative EPT terpolymers which may be employed in practice of the process of this invention may be those set forth in the following table, the first listed being preferred:

TABLE

A. The Epsyn 4006 brand of EPT marketed by Copolymer Rubber and Chemical Corp., containing 58 mole % of units derived from ethylene, 40 mole % of units derived from propylene, and 2 mole % of units derived from ethylidene norbornene and having a $\overline{M}_n$ of 120,000 and a polydispersity index $\overline{M}_w/\overline{M}_n$ of 2.2.

B. The Ortholeum 5655 brand of EPT marketed by DuPont containing 62 mole % of units derived from ethylene, 36 mole % of units derived from propylene, and 2 mole % of units derived from 1,4-hexadiene and having a $\overline{M}_n$ of 75,000 and a polydispersity index $\overline{M}_w/\overline{M}_n$ of 2.

C. The Ortholeum 2052 brand of EPT marketed by DuPont containing 62 mole % of units derived from ethylene, 36 mole % of units derived from propylene, and 2 mole % of units derived from 1,4-hexadiene and having a $\overline{M}_n$ of 35,000 and a polydispersity $\overline{M}_w/\overline{M}_n$ of 2.

D. The Royalene brand of EPT marketed by Uniroyal containing 60 mole % of units derived from ethylene, 37 mole % of units derived from propylene, and 3 mole % of units derived from dicyclopentadiene and having a $\overline{M}_n$ of 100,000 and a polydispersity index $\overline{M}_w/\overline{M}_n$ of 2.5.

E. The Epsyn 40A brand of EPT marketed by Copolymer Rubber and Chemical Corp., containing 60 mole % of units derived from ethylene, 37 mole % of units derived from propylene, and 3 mole % of units derived from ethylidene norbornene and having a $\overline{M}_n$ of 140,000 and a polydispersity index $\overline{M}_w/\overline{M}_n$ of 2.

The EPM and EPT polymers may contain minor portions (typically less than about 30%) of other units derived from other copolymerizable monomers.

The First Reactant

The first reactant which may be employed in practice of the process of this invention contains ethylenic unsaturation and an epoxide moiety.

Preferably the first reactant may be characterized by the formula:

wherein

C=C is an ethylenically unsaturated double bond;

$R^v$ or $R^{vi}$ is a divalent hydrocarbon moiety selected from the group consisting of alkylene, alkarylene, aralkylene, cycloalkylene, and arylene;

R' is hydrogen, alkyl, alkaryl, aralkyl, cycloalkyl, or aryl;

R" is a divalent moiety selected from the group consisting of —COO— and —$R^v$—; and a is an integer greater than 0;

b is 0 or 1;

c is an integer 1–3; and d is 0 or 1.

In the above formula, R' may be hydrogen or a hydrocarbon selected from the group consisting of alkyl, aralkyl, cycloalkyl, aryl, and alkaryl, including such radicals when inertly substituted. When R' is alkyl, it may typically be methyl, ethyl, n-propyl, iso-propyl, n-butyl, i-butyl, sec-butyl, amyl, octyl, decyl, octadecyl, etc. When R' is aralkyl, it may typically be benzyl, beta-phenylethyl, etc. When R' is cycloalkyl, it may typically be cyclohexyl, cycloheptyl, cyclooctyl, 2-methylcycloheptyl, 3-butylcyclohexyl, 3-methylcyclohexyl, etc. When R' is aryl, it may typically be phenyl, naphthyl, etc. When R' is alkaryl, it may typically be tolyl, xylyl, etc. R' may be inertly substituted i.e. it may bear non-reactive substituent such as alkyl, aryl, cycloalkyl, etc. Typically inertly substituted R' groups may include 4-methyl cyclohexyl, etc. The preferred R' groups may be lower alkyl, i.e. $C_1$–$C_{10}$ alkyl, groups including e.g. methyl, ethyl, n-propyl, i-propyl, butyls, amyls, hexyls, octyls, decyls, etc.

In the above formula, $R^v$ or $R^{vi}$ may be a divalent hydrocarbon radical selected from the group consisting of alkylene, aralkylene, cycloalkylene, arylene, and alkarylene including such radicals when inertly substituted. When $R^v$ or $R^{vi}$ is alkylene, it may typically be methylene, ethylene, n-propylene, iso-propylene, n-butylene, i-butylene, sec-butylene, amylene, octylene, decylene, octadecylene, etc. When $R^v$ or $R^{vi}$ is aralkylene, it may typically be benzylene, beta-phenylethylene, etc. When $R^v$ or $R^{vi}$ is cycloalkylene, it may typically be cyclohexylene, cycloheptylene, cyclooctylene, 2-methylcycloheptylene, 3-butylcyclohexylene, 3-methylcyclohexylene, etc. When $R^v$ or $R^{vi}$ is alkarylene, it may typically be tolylene, xylylene, etc. $R^{vi}$ may be inertly substituted i.e. it may bear a non-reactive substitutent such as alkyl, aryl, cycloalkyl, ether, etc. Typically inertly substituted $R^v$ or $R^{vi}$ groups may include 2-ethoxyethylene, carboethoxymethylene, 4-methyl cyclohexylene, etc. The preferred $R^v$ or $R^{vi}$ groups may be lower alkyl, i.e. $C_1$–$C_{10}$ alkylene, groups including e.g. methylene, ethylene, n-propylene, i-propylene, butylene, amylene, hexylene, octylene, decylene, etc. $R^v$ and $R^{vi}$ may typically be methylene —$CH_2$—.

In the above formula, R" is a divalent moiety selected from the group consisting of —COO— and —$R^v$—. Preferably R" is —COO—.

a is an integer, greater than 0; and preferably a is 1. It is preferred that the double bond be not on the carbon atom which forms the epoxy ring. Preferably there is only one ethylenic double bond in the molecule; and when there are more, it is preferred that they be separated i.e. not adjacent or conjugated.

b is an integer 0–1. When b is 0 and d is 1, it will be apparent that the composition includes an ether moiety. When b is 1 and d is 0, the composition includes an ester moiety if R" is —COO—.

c is an integer 1–3. Preferably c is 1.

d is an integer 0–1.

In its preferred aspects, the first reactant may be characterized by the formula

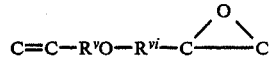

Typical first reactants may include the following:

TABLE allyl glycidyl ether
2-methallyl glycidyl ether
glycidyl methacrylate
p-glycidyl styrene
styrene-p-glycidyl ether
3,4-epoxy-1-pentene
3,4-epoxy-1-butene The preferred first reactant is glycidyl methacrylate.

Graft Polymerization

In practice of the first step of the process of this invention, the first reactant, typified by glycidyl methacrylate or allyl glycidyl ether, may be graft polymerized onto the charge polymer.

The grafting reaction of the dispersant monomer may be carried out in the following manner. The polymer onto which the dispersant monomer is to be grafted is added to the diluent-solvent in the reaction vessel and heated at 80° C.–160° C. to form a homogenous solution. The dispersant monomer and free radical initiator in a molar ratio of monomer to initiator of 1–8:1, preferably 2.5–1:1 are added. The temperature of the solution is maintained above the decomposition temperature of the initiator for 0.25–5 hours, preferably 0.4–4 hours, under an inert atmosphere to form the desired product.

In a typical grafting reaction, a solution containing 20 parts of ethylene-propylene copolymer and 80 parts of solvent such as hexane or mineral oil is prepared. Then 2.5 parts of a first reactant and 1 part of free-radical initiators are added. Free radical initiators, such as dicumyl peroxide, dibenzoyl peroxide, di-t-butyl peroxide, azobisisobutyronitrile, diacetyl peroxide, t-butylperacetate, or diisopropyl peroxydicarbonate may be employed in the present process and maintained in the presence of nitrogen at temperature of 155°±5° C. and atmospheric pressure (when mineral oil is a solvent) or a pressure of 200 psig (when hexane is the solvent) for 1 hour. Enough mineral oil is then added to obtain a fluid concentrate at room temperature. When the grafting is carried out in hexane, a stripping step is included to remove the hexane which is replaced by the mineral oil.

The product graft polymer may contain 0.3-20 mole %, preferably 0.5-10 mole %, say 2 mole % derived from the dispersant first monomer.

The Second Reactant

The second reactant which may be employed may be one containing thiol —SH groups. Preferably, it may be of the form HSR'''COOH wherein R''' may be a hydrocarbon group selected from the group consisting of alkylene, aralkylene, cycloalkylene, arylene, and alkarylene, including such radicals when inertly substituted. When R''' is alkylene, it may typically be methylene, ethylene, n-propylene, iso-propylene, n-butylene, i-butylene, sec-butylene, amylene, octylene, decylene, octadecylene, etc. When R''' is aralkylene, it may typically be benzylene, octadecylene, etc. When R''' is aralkylene, it may typically be benzylene, beta-phenylethylene, etc. When R''' is cycloalkylene, it may typically be cyclohexylene, cycloheptylene, cyclooctylene, 2-methylcyclohexylene, etc. When R''' is arylene, it may typically be phenylene, naphthylene, etc. When R''' is alkarylene, it may typically be tolylene, xylylene, etc. R''' may be inertly substituted i.e. it may bear a nonreactive substituent such as alkyl, aryl, cycloalkyl, ether, etc. Typically inertly substituted R''' groups may include 2-ethoxyethylene, carboethoxymethylene, 4-methylcyclohexylene, etc. The preferred R''' groups may be lower alkylene, i.e. $C_1$-$C_{10}$ alkylene, groups including e.g. methylene, ethylene, n-propylene, i-propylene, butylene, amylene, hexylene, octylene, decylene, etc. R''' may preferably be ethylene —$CH_2CH_2$—.

Typical HSR''' COOH compounds may be as follows:

TABLE mercaptoacetic acid
2-mercaptopropionic acid
3-mercapto-n-butyric acid
2-mercapto-n-butyric acid
4-mercaptobenzoic acid
3-mercaptobenzoic acid
2-mercaptobenzoic acid Compounds containing more than one —SH group and/or more than one —COOH group may be utilized. The preferred compound may be mercaptoacetic acid.

Functionalization

The graft polymer obtained in the first step, typically of molecular weight $\overline{M}_n$ of 10,000-1,000,000 say 120,000, in a 5-50 w %, say 20 w % solution of 145 P Pale turbine stock oil, may be functionalized without further work-up. To graft polymer (100 parts) in 100-2000 parts, say 400 parts of solvent at 100° C. 200° C., say 150° C., there is added 5-10 parts, say 7.5 parts of second functionalizing reactant typically mercaptoacetic acid. This corresponds to a mole ratio of second reactant added to first reactant present in the graft polymer of 1:1-10:1, preferably 0.5:1-2:1, say 1:1.

The reaction mixture is purged with nitrogen and maintained at 50° C.-200° C., say 155° C. for 1-10 hours, say 1.5 hours. At the end of the reaction period, the reaction mixture is cooled to ambient temperature. The product so recovered is typically a 2-10 w %, say 5 w % of dispersant graft polymer in solution in solvent, typically mineral oil or hexane.

Typical products may be analyzed by infra-red analysis.

Illustrative products which may be formed may include the following:

TABLE

A. EPM containing 60 mole % derived from ethylene and 40 mole % derived from propylene ($\overline{M}_n$ of 140,000 and $\overline{M}_w/\overline{M}_n$ of 1.6) onto which has been grafted glycidyl methacrylate (in amount of 2 moles per 1000 units of polymer molecular weight) which has thereafter been functionalized with mercaptoacetic acid (to contain 1 moles of moiety derived from the latter per mole of units derived from glycidyl methacrylate).

B. EPT containing 62 mol % ethylene, 36 mol % propylene and 2 mol % 1,4 hexadiene grafted with glycidyl methacrylate in amount of 2 mol per 1000 units of polymer molecular weight. ($\overline{M}n=120,000$ & $\overline{M}w/\overline{M}n=2.2$).

C. EPT containing 62 mol % ethylene, 36 mol % propylene and 2 mol % 1,4 hexadiene grafted with allyl glycidyl ether in amount of 2 mol per 1000 units of polymer molecular weight. ($\overline{M}n=120,000$ & $\overline{M}w/\overline{M}n=2.2$).

D. EPT containing 62 mol % ethylene, 37 mol % propylene and 3 mol % dicyclopentadiene grafted with glycidyl mathacrylate in amount of 2 mol per 1000 units of polymer molecular weight. ($\overline{M}n=100,000$ & $\overline{M}w/\overline{M}n=2.5$).

E. EPT containing 62 mol % ethylene, 37 mol % propylene and 3 mol % dicyclopentadiene grafted with allyl glycidyl ether in amount of 2 mol per 1000 units of polymer molecular weight. ($\overline{M}n=100,000$ & $\overline{M}w/\overline{M}n=2.5$).

The novel polymer products of this invention are polymers containing a moiety derived from the dispersant monomer. It is a particular feature of this invention, when the product is to be used as a lubricating oil additive, that the polymer (ex dispersant monomer) be preferably one which is employed in lubricating oil to attain desired improvement e.g. as in viscosity index. Typical viscosity index improving polymers include polyolefins typified by EPR ethylene-propylene copolymers; EPT ethylene-propylene-third monomer (typically diene) polymersl; ethylene-vinyl acetate copolymers; polymethacrylates, etc.

The polymeric products of this invention may be added to lubricating oil compositions to impart thereto improvements in viscosity index and in dispersancy. Typical lubricating oils to which the additives of this invention may be added include summer or winter automotive lubricating oils, airplane engine oils, railway diesel lubricating oils, etc.—whether hydrocarbon derived or synthetic. Typically the polymer additive may be present in minor effective, viscosity index improving, amount of 0.1-20 w %, preferably 0.5-20 w %, say 10 w %. This may correspond to presence of groups derived from the dispersant monomer in amount of 0.2–1.5 w %, preferably 0.1–0.8 w %, say 0.05 w %.

Addition of the polymeric additive of this invention to a lubricating oil may be facilitated by use of a concentrate containing 2–30 w %, preferably 6–20 w %, say 9 w % of additive in a diluent-solvent which may in the preferred embodiment be the same as the lubricating oil in which the additive is to be formulated.

It is a feature of this invention that the improved lubricating oils are characterized by improved dispersancy as measured in the Bench VC Test. In the Bench VC Test, dispersancy relative to three references is tested. The reference blends are known to possess an excellent dispersancy, a good dispersancy, and a poor dispersancy. Better dispersants are characterized by lower ratings; and a rating at around the good standard is indicative of a promising candidate.

DESCRIPTION OF SPECIFIC EMBODIMENT

Practice of this invention will be apparent to those skilled in the art from the following wherein, as elsewhere in this description, all parts are parts by weight unless otherwise specified. In all formulae, all unfilled valence bonds may be filled with hydrogen atoms or with inert substitutents.

EXAMPLE I

In this example which represents the best mode presently known of practicing the first step of the invention, there is added to a reaction vessel an ethylene-propylene ($\overline{M}_n$ of 140,000 copolymer containing 60 mole % units derived from ethylene, 40 mole % units derived from propylene, in amount of 550 parts as a 20 w % solution in 2200 parts of 145 PPTS HF oil. The reaction vessel is purged with nitrogen and then heated to 152° C.

There is added glycidyl methacrylate (68.5 parts, 2 moles) as a solution in 68.5 parts of 145 PPTS HF oil. Dicumyl peroxide (30 parts) is added as a solution in 130 parts of 145 PPTS HF oil. The mixture is maintained at 160° C. for 4 hours as grafting occurs.

The product grafted polymer contains about 2 units derived from glycidyl methacrylate per 1000 units of molecular weight.

Comparable product may be attained if the charge ethylene-propylene polymer is as follows:

TABLE

| Example | Polymer |
| --- | --- |
| II | Ethylene-propylene-norbornene |
| III | Styrene-butadiene |
| IV | Ethylene-propylene-cyclopentadiene |
| V | Ethylene-propylene-1,4-hexadiene |

Results comparable to those of Example I may be obtained if the following are used (in equimolar quanties) as first reactant in place of the glycidyl methacrylate:

TABLE

| Example | First Reactant |
| --- | --- |
| VI | Allyl glycidyl ether |
| VII | 2-methallyl glycidyl ether |
| VIII | p-glycidyl styrene |
| IX | 3,4 epoxy-1-butene |
| X | styrene-p-glycidyl ether |

EXAMPLE XI

In this example of the best mode of the second step of the invention, there is added to the product graft polymer prepared in Example I (10 parts) in 190 parts of 145 PPTS HF oil solvent, mercaptoacetic acid (3.10 parts). The mixture is purged with nitrogen and heated to 100° C. After hours, the reaction mixture is cooled to room temperature; and the product functionalized polymer precipitates. Infrared analysis indicates presence of product-related hydroxyl group and enhancement of ester carbonyl. The product contains about one mercaptoacetic acid-derived group per glycidyl methacrylate-derived group. The molecular weight $\overline{M}_n$ is 140,000.

Results comparable to those obtained in Example XI may be obtained if the polymer is that of Examples II–V as follows:

TABLE

| Example | Polymer of Example |
| --- | --- |
| XII | II |
| XIII | III |
| XIV | IV |
| XV | V |

Results comparable to those of Example XI may be obtained if the following (in equimolar quantities) are employed in place of mercaptoacetic acid.

TABLE

| Example | Second Reactant |
| --- | --- |
| XVI | 2-mercaptopropionic acid |
| XVII | 3-mercapto-n-butyric acid |
| XVIII | 3-mercaptobenzoic acid |
| XIX | 2-mercaptobenzoic acid |
| XX | 2-mercapto-n-butyric acid |

EXAMPLE XXI

The product of Example XI is tested for dispersancy by the Bench VC Test (BVCT), at a concentration of 10 w % in a fully formulated lubricating oil having the following properties and components:

TABLE

| Component | Parts by Weight |
| --- | --- |
| Solvent neutral oil 7 | 75.25 |
| Solvent neutral oil 20 | 21.64 |
| Zinc Dialkyldithiophosphate | 1.22 |
| 4,4' dinonyldiphenylamine | 0.39 |
| Overbased magnesium sulfonate | 1.50 |
| Silicone antifoamant | 150 ppm |
| Product | 5.36 |
| Analyses | |
| Viscosity Kin 40C CS | 31.57 |
| Viscosity Kin 100C CS | 5.36 |
| Pour Point, F | 0 |
| Ash Sulfated, % D874 | 0.90 |
| Phosphorus, % X-Ray | 0.11 |
| Sulfur, % X-Ray Total | 0.54 |
| Zinc, % X-Ray | 0.12 |
| Magnesium, % | 0.15 |
| CC Simulator-18C | 1580 |

Solvent neutral oil 7 has a sp. gr. 60/60° F. of 0.858–0.868; Vis @ 100° F. of 123–133; Pour Point 0° F. Solvent neutral oil 20 has a sp. gr. 60/60° F. of 0.871–0.887; Vis. @ 100° F. of 325–350; Pour Point +10° F. Zinc salt is a salt of mixed alcohols - isopropanol and $P_2S_5$ product as described in U.S. Pat. No. 3,293,181. The overbased magnesium sulfonate had a TBN of 395 and is a salt of branched $C_{20}$-$C_{40}$ monoalkylbenzene sulfonic acid (MW 530-540) together with about 10% magnesium carbonate, 14% magnesium hydroxide and 4% magnesium sulfate.

The sample of Example XI showed a BVCT rating of 30.2 in comparison with the BVCT standards of 8.6/31.4/50.0. This evidences a degree of dispersancy which indicates that the product is a good candidate.

When tested as a viscosity index improver, this sample showed viscosity improvement when measured by the Kinematic viscosity test.

EXAMPLE XXII

The sample of Example I is tested in the BVCT and found to have a BVCT rating of 99.3. Clearly this indicates that without the mercaptoaceto containing functionality, the product has an unsatisfactory rating.

It is understood that although modifications and variations of the invention may be made without departing from the spirit and scope thereof, only such limitations should be imposed as are indicated in the appended claims.

What is claimed is:

1. A polymer comprising
   (i) a carbon-carbon backbone containing residual unsaturation; and graft polymerized thereon
   (ii) a first reactant containing ethylenic unsaturation and an epoxide moiety; thereby forming a graft polymer said graft polymer being derivatized with
   (iii) a second reactant containing at least one —SH group and at least one —COOH group.

2. A polymer as claimed in claim 1 wherein said carbon-carbon backbone containing residual unsaturation is an olefin polymer.

3. A polymer as claimed in claim 2 wherein said olefin polymer is a polymer of ethylene.

4. A polymer as claimed in claim 2 wherein said olefin polymer is a polymer of propylene.

5. A polymer as claimed in claim 2 wherein said olefin polymer is a copolymer of ethylene-propylene.

6. A polymer as claimed in claim 2 wherein said olefin polymer is a copolymer of ethylene-propylene-diene.

7. A polymer as claimed in claim 2 wherein said olefin polymer is a polymer of ethylene-propylene or ethylene-propylene-diene, having a molecular weight $\overline{M}_n$ of 10,000-1,000,000.

8. A polymer comprising moieties derived from
   (i) at least one ethylenically unsaturated polymerizable monomer C=CA wherein A is hydrogen, halogen, acyloxy or a hydrocarbon selected from the group consisting of alkyl, cycloalkyl, aralkyl, aryl and alkenyl;
   (ii) a first reactant containing ethylenic unsaturation and an epoxide moiety of the formula

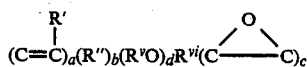

wherein
C=C is an ethylenically unsaturated double bond;
$R^v$ and $R^{vi}$ are each independently a divalent hydrocarbon moiety selected from the group consisting of alkylene, alkarylene, aralkylene, cycloalkylene, and arylene;
R' is hydrogen, alkyl, alkaryl, aralkyl, cycloalkyl, or aryl;

R" is a divalent moiety selected from the group consisting of —COO— and —$R^v$;
a is an integer greater than 0;
b is 0 or 1;
c is an integer 1-3; and
d is 0 or 1; and
   (iii) a second reactant HSR'''COOH wherein R''' is independently selected from the same group as that from which $R^v$ is selected.

9. A polymer comprising a copolymer of ethylene-propylene or ethylene-propylene-diene third monomer bearing moieties graft polymerized thereon derived from glycidyl methacrylate, said polymer having been after treated with mercaptoacetic acid.

10. A lubricating composition comprising a major portion of a lubricating oil and a minor effective viscosity index improving portion of a polymer comprising
    (i) a carbon-carbon backbone containing residual unsaturation; and graft polymerized thereon to form graft polymer
    (ii) a first reactant containing ethylenic unsaturation and an epoxide moiety; thereby forming a graft polymer said graft polymer being derivatized with
    (iii) a second reactant containing at least one —SH group and at least one —COOH group.

11. A lubricating composition as claimed in claim 10 wherein said carbon-carbon backbone containing residual unsaturation is an olefin polymer.

12. A lubricating composition as claimed in claim 11 wherein said olefin polymer is a polymer of ethylene.

13. A lubricating composition as claimed in claim 11 wherein said olefin polymer is a polymer of propylene.

14. A lubricating composition as claimed in claim 11 wherein said olefin polymer is a copolymer of ethylene-propylene.

15. A lubricating composition as claimed in claim 11 wherein said olefin polymer is a copolymer of ethylene-propylene-diene.

16. A lubricating composition as claimed in claim 11 wherein said olefin polymer is a polymer of ethylene-propylene-diene, having a molecular weight $\overline{M}_n$ of 10,000-1,000,000.

17. A lubricating composition as claimed in claim 11 wherein minor effective viscosity improving portion is 0.1-20 w %.

18. A lubricating composition comprising a major portion of a lubricating oil and a minor effective viscosity-index improving portion of 0.1-20 w % of a polymer comprising moieties derived from
    (i) at least one ethylenically unsaturated polymerizable monomer C=CA wherein A is hydrogen, halogen, acyloxy or a hydrocarbon selected from the group consisting of alkyl, cycloalkyl, aralkyl, alkaryl, aryl and alkenyl
    (ii) a first reactant containing ethylenic unsaturation and an epoxide moiety of the formula

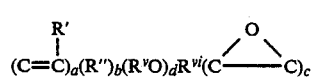

wherein
C=C is an ethylenically unsaturated double bond;
$R^v$ and $R^{vi}$ are each independently a divalent hydrocarbon moiety selected from the group consisting of alkylene, alkarylene, aralkylene, cycloalkylene, and arylene;

R' is hydrogen, alkyl, alkaryl, aralkyl, cycloalkyl, or aryl;

R" is a divalent moiety selected from the group consisting of —COO— and $R^v$;

a is an integer greater than 0;

b is 0 or 1;

c is an integer 1–3; and d is 0 or 1; and (iii) a second reactant HSR''' COOH wherein R''' is independently selected from the same group as that from which $R^v$ is selected.

19. A lubricating composition comprising a major portion of a lubricating oil and a minor effective viscosity-index improving portion of 0.1–20 w % of a polymer comprising a copolymer of ethylene-propylene or ethylene-propylene-diene third monomer bearing moieties graft polymerized thereon derived from glycidyl methacrylate, said polymer having been after treated with mercaptoacetic acid.

* * * * *